United States Patent
Nakamura

[11] Patent Number: 5,868,358
[45] Date of Patent: Feb. 9, 1999

[54] RENDEZVOUS SPACECRAFT COLLISION AVOIDANCE DEVICE

[75] Inventor: Taichi Nakamura, Tokyo, Japan

[73] Assignee: Mitsubishi Denki Kabushiki Kaisha, Tokyo, Japan

[21] Appl. No.: 844,243

[22] Filed: Apr. 18, 1997

[30] Foreign Application Priority Data

Apr. 22, 1996 [JP] Japan ................................. 8-100557

[51] Int. Cl.$^6$ ................. B64G 1/26; B64G 1/40
[52] U.S. Cl. .................... 244/169; 244/172; 244/161
[58] Field of Search ................... 244/161, 169, 244/172; 701/13

[56] References Cited

U.S. PATENT DOCUMENTS

| | | | |
|---|---|---|---|
| 4,961,551 | 10/1990 | Rosen ................................. | 244/169 X |
| 5,042,752 | 8/1991 | Surauer et al. ..................... | 244/169 X |
| 5,109,345 | 4/1992 | Dabney et al. ..................... | 244/161 |
| 5,279,484 | 1/1994 | Zimmerman et al. ............... | 244/172 |
| 5,294,079 | 3/1994 | Drazin et al. ...................... | 244/169 |
| 5,335,179 | 8/1994 | Boka et al. ........................ | 244/169 X |
| 5,340,060 | 8/1994 | Shindo ............................... | 244/161 |
| 5,433,402 | 7/1995 | Surauer et al. .................... | 244/169 X |

FOREIGN PATENT DOCUMENTS 0 122 890 A1  10/1984  European Pat. Off. .
WO 87/02797   5/1987   WIPO .

OTHER PUBLICATIONS

W.H. Clohessy et al., "Terminal Guidance System for Satellite Rendezvous," *Journal of the Aerospace Sciences*, Sep. 1960, pp. 653–658.

W.D. Brayton, "Dynamic Analysis of the Probe and Drogue Docking Mechanism," *Journal of Spacecraft and Rockets*, vol. 3, No. 5, May 1996, pp. 700–706.

*Primary Examiner*—William Grant
*Attorney, Agent, or Firm*—Burns, Doane, Swecker & Mathis, LLP

[57] ABSTRACT

In the present invention four thrusters are provided as a group of thrusters for collision avoidance. These thrusters contain a component of translational thrust for collision avoidance injection in their respective outputs, and are capable of simultaneously generating posture control torque around two coordinate axes, which are orthogonal to a thrust axis, in order to maintain the directional stability of the thrust axis during the injection. When abnormality arises in a group of thrusters for ordinary use, collision avoidance is executed by replacing all the thrusters for ordinary use by these thrusters for collision avoidance.

8 Claims, 5 Drawing Sheets

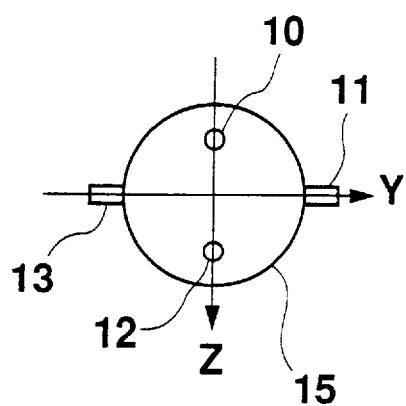
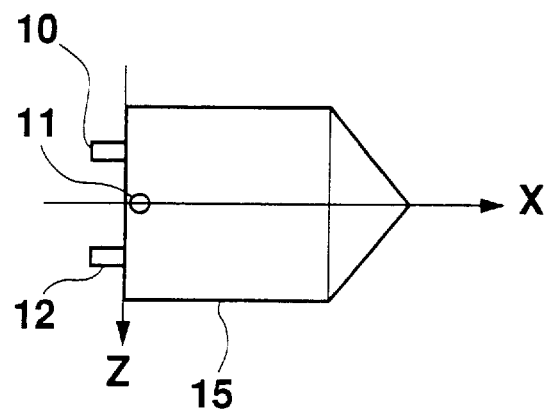
Fig. 3(a)     Fig. 3(b)

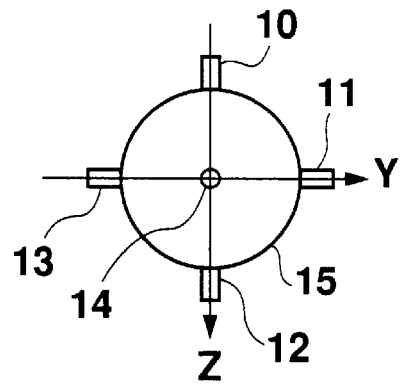
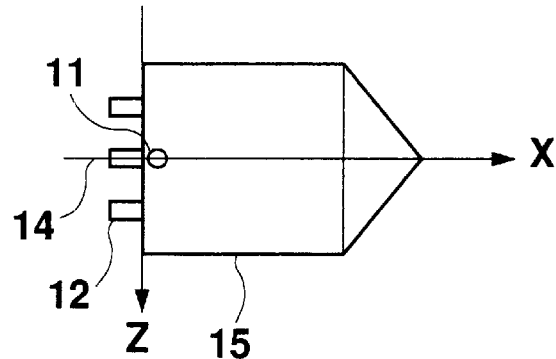
Fig. 4(a)　　　　Fig. 4(b)
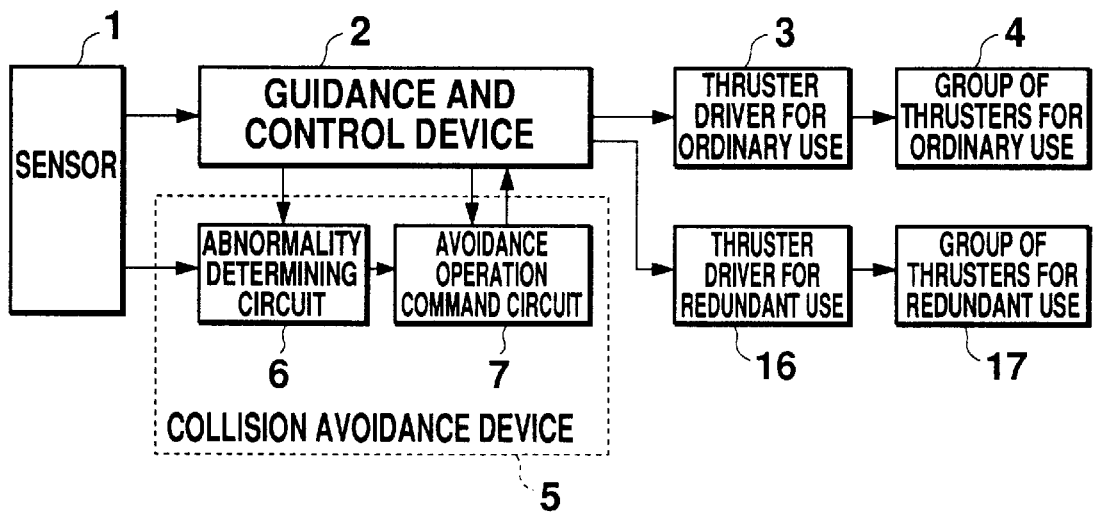
Fig. 5 PRIOR ART

RENDEZVOUS SPACECRAFT COLLISION AVOIDANCE DEVICE

BACKGROUND OF THE INVENTION

1. Field of the Invention

The present invention relates to a collision avoidance device for preventing a rendezvousing spacecraft from colliding against a target when an abnormal situation arises during the flight by employing a sensor close to a target in space, in addition to a guidance and control device, thrusters, and the like.

2. Description of the Related Art

FIG. 5 shows a collision avoidance device and the associated devices of a conventional rendezvous spacecraft. In FIG. 5, numeral 1 represents a navigation sensor (hereinafter referred to as a sensor) for measuring and computing flight conditions of the rendezvousing spacecraft, such as a relative position to a target, a posture, and acceleration. Numeral 2 represents a guidance and control device. Numeral 3 represents a circuit (hereinafter referred to as a thruster driver for ordinary use) for driving a group of thrusters (hereinafter referred to as a group of thrusters for ordinary use) which generate translation force and triaxial rotation torque in three dimensional space. Numeral 4 represents a group of thrusters for ordinary use. Numeral 5 represents a collision avoidance device. Numeral 6 represents an abnormality determining circuit. Numeral 7 represents an avoidance operation command circuit. Numeral 16 represents a circuit (hereinafter referred to as a thruster driver for redundant use) for driving a group of spare thrusters (hereinafter referred to as a group of thrusters for redundant use) which have functions equivalent to those of the group of thrusters for ordinary use. Numeral 17 represents the group of thrusters for redundant use whose constitution is same as that of the group of thrusters for ordinary use.

In the conventional arrangement described above, each of those devices, including the collision avoidance device 5, operates in the following manner. During a normal flight, in accordance with instrumentation signals transmitted from the sensor 1, the guidance and control device 2 computes required controlling force of six degrees of freedom, in total, concerning position control and triaxial posture control in three dimensional space. A drive command is then generated for each thruster. The thruster driver for ordinary use 3 drives the group of thrusters for ordinary use 4 in response to the received drive command. After execution of a sequence of the operations, a rendezvous flight to the target is performed. However, if any one of the devices malfunctions, for example, due to an abnormal operation, e.g., a cutoff of output from the sensor 1 or an erroneous injection, a normal rendezvous flight will not be performed. In a worst case, the chaser spacecraft and the target may collide with each other.

In order to avoid such a collision during the flight, in the collision avoidance device 5, the abnormality determining circuit 6 selects a signal which the guidance and control device 2 has designated from among monitor signals concerning the flight conditions, (e.g., a relative position, a posture, and acceleration), outputted by the sensor 1. The abnormality determining circuit 6 then compares the signal, or a value computed from the signal, with a reference value which has been previously set in the abnormality determining circuit 6, thereby performing a repeated determination of the presence of an abnormality, such as a mechanical failure, an excess of posture error, and a deviation from a predetermined orbit. When any abnormality is found, the avoidance operation command circuit 7 is notified of the abnormal incident. The avoidance operation command circuit 7 then determines how to cope with the situation based on the type of abnormal incident and a criterion showing the risk of collision, (e.g., an estimated amount of time the spacecraft reaches the target), which is provided by the guidance and control device 2. An outcome of the determination is transmitted to the guidance and control device 2 as a command to perform the collision avoidance.

If the avoidance operation command circuit 7 determines that any failure arises or may arise in the group of thrusters although there is not sufficient time left before the spacecraft reaches the target, the group of thrusters will be switched to the group of thrusters for redundant use, and a command to perform the injection for collision avoidance will be given to the guidance and control device 2. In accordance with the command, the guidance and control device 2 computes the required controlling force of six degrees of freedom, to carry out the injection for collision avoidance and to maintain an appropriate posture during the period, and inputs a drive command for each thruster, to the thruster driver for redundant use 16. Consequently, a group of thrusters for redundant use 17 is activated and the injection for collision avoidance is finally executed.

A correlation between a direction of the injection for collision avoidance and an avoidance orbit is shown by an "equation 1." Equation 1 is a so-called Hill equation. This is an equation of motion which shows a relative position of the rendezvousing spacecraft to the target by setting the coordinate origin to be the target, X-axis to be in the direction of the orbit of the target, and Z-axis to be in the direction of the center of the earth. (Y-axis, namely, motion in the direction which deviates from the spacecraft's orbital plane is omitted because such motion does not influence collision avoidance.) FIG. 6 illustrates an example of the solution of the equation 1. In FIG. 6, numeral 15 represents the rendezvousing spacecraft and numeral 18 represents the target. Coordinates X and Z are in the direction of the orbit of the target and the direction of the center of the earth, respectively, as shown in the equation 1. As shown in the drawing, if thrust is applied in the direction of orbit by the injection for collision avoidance, the rendezvousing spacecraft 15 will pass over and move away in the backward direction towards the target 18. If the thrust is applied in the reverse direction of the orbit, the rendezvousing spacecraft 15 will pass below and move away in the forward direction towards the target 18.

[Equation 1]

$$d^2X/dt^2 - 2\omega dZ/dt = 0$$

$$d^2Z/dt^2 + 2\omega dX/dt - 3\omega^2 Z = 0$$

X: Relative distance of the rendezvousing spacecraft, which is moving in the forward direction, to the target Z: Relative distance of the rendezvousing spacecraft, which is moving in the direction of the earth, to the target ω: Orbit angular velocity The aforementioned principle is applied to collision avoidance. In order to execute collision avoidance safely, a relative position to the target, and a direction and time period of the injection according to relative velocity, shall be appropriately set beforehand in the avoidance operation command circuit 7. In order to avoid such a collision, it is essential to apply the thrust as previously set. Therefore, the rendezvousing spacecraft is usually equipped with at least a group of thrusters for redundant use 17 as a way of precaution against a failure of the group of thrusters for ordinary use 4. An example of the arrangement of the groups of thrusters is shown in FIG. 7. As shown in FIG. 7, for the purposes of generating three dimensional translation force and triaxial rotation torque, the arrangement of a group of thrusters for rendezvousing is such that a mass of thrusters are arranged in a complicated manner. Here, a solid line arrow represents one of the thrusters for avoidance, and a dashed line arrow represents one of the thrusters for redundant use. Each of these arrows shows a direction of the injection.

There is another method of preventing such a collision. In this method (hereinafter referred to as an arrangement method), none of the thrusters for redundant use 17 are used, but translation force and rotation torque for the collision avoidance are generated by removing one or more of the broken thrusters from the group of thrusters for ordinary use 4 and then combining the remaining thrusters. This is a method which uses software logic capable of processing according to the number of combination of thrusters shown in an "equation 2." More specifically, in the guidance and control device 2 of FIG. 5, the software logic needed to generate the required translation force and rotation torque is prepared in advance with arbitrary thrusters being excluded, and a command to perform posture control and injection for collision avoidance is provided to the thruster driver for ordinary use 3. Here, the posture control and the injection for collision avoidance are performed by a combination of thrusters which excludes the broken thruster(s) specified by the collision avoidance device 5.

[Equation 2]

The number of combination(C) when excluding m pieces from n pieces of thrusters:

$$nCm = \frac{n!}{m!(n-m)!}$$

Example of calculation: if n is 16 and m is 2, $_{16}C_2$ will be 120 ways.

In the prior art, there are some problems. More specifically, the injection for collision avoidance and the posture control during the injection are carried out by using the group of thrusters for redundant use 17, which function to generate three dimensional translation force and triaxial rotation torque, equivalent to the group of thrusters for ordinary use as described above. Consequently, the prior art has superfluous functions for ensuring safety of the rendezvousing spacecraft and the target and involves a complicated construction and a comparatively high cost. On the other hand, if such injection for collision avoidance and posture control during the injection are carried out, for the purposes of solving the aforementioned problems, by an arbitrary combination of the remaining thrusters which are left after only arbitrary thrusters, namely, broken thrusters were excluded from a group of thrusters for ordinary use, there are a larger number of ways of combining these thrusters as shown in the equation 2. Therefore, software for processing the data will become large in scale, and costs required for the verification of the software will increase.

SUMMARY OF THE INVENTION

The present invention is made in order to solve the problems described above. It is directed to provide a system which has a simple construction of thrusters that is not burdensome to software by using a group of thrusters that have a minimum of essential function to avoid the collision of a spacecraft (hereinafter referred to as a group of thrusters for collision avoidance) and are independent of a group of thrusters for ordinary use.

The present invention is related to a device for avoiding the collision of a rendezvousing spacecraft. The present invention has a plurality of thrusters for collision avoidance that are separate from thrusters for ordinary use. The thrusters for collision avoidance generate translational thrust and posture control torque around two axes which are orthogonal to a translational thrust axis representing the translational thrust. When collision avoidance is required, a collision avoidance operation is carried out maintaining the generation of thrust in the direction of a translational thrust vector by driving the thrusters for collision avoidance.

As described above, only the thrusters for collision avoidance are driven when avoiding a collision. As it is understood what kind of avoidance operation can be performed, decision making with regard to the avoidance is very easy. Only thrusters for avoidance are provided, whereby a minimum of thrusters necessary for collision avoidance, is enough. Therefore, construction of thrusters can be simplified and control is easily performed.

Also, a collision avoidance operation is carried out by rendering at least one of the aforementioned plural thrusters for collision avoidance inactive. Consequently, this also leads to an appropriate and easily controllable avoidance operation.

Also, the aforementioned plural thrusters for collision avoidance consist of at least four thruster units. These four thrusters contain a component of translational thrust in their respective outputs. Also, these four thrusters generate posture control torque around those two axes which are orthogonal to the translational thrust axis, and control relative outputs of the plural thrusters for collision avoidance, whereby a collision avoidance operation is executed.

It is preferable that the plural thrusters for collision avoidance mentioned above include four pieces of thrusters in the following manner: these four thrusters are arranged on two axes which are orthogonal to the translational thrust axis and also meet each other at right angles at the origin, namely, a certain point of the translational thrust axis. The thrusters are paired and each pair faces each other with the origin as the center. Also, each of the thrusters' outputs thrust in a direction which is parallel to the translational thrust axis.

It is also preferable that the plural thrusters for collision avoidance mentioned above include at least two thruster-units for translation and at least two thrusterunits for posture control. The former are capable of outputting a component of translational thrust and at the same time generating posture control torque around the first axis which is orthogonal to the translational thrust axis. The latter independently carry out posture control around the second axis which is orthogonal to both the aforementioned translational thrust axis and the aforementioned first axis.

It is also preferable that the aforementioned thrusters for translation are arranged opposite to each other with a point of intersection of the second axis and the translational thrust axis as the center, and output thrust in a direction which is parallel to the translational thrust axis, whereas the aforementioned thrusters for posture control are arranged opposite to each other with a point of intersection of the first axis and the translational thrust axis as the center, and output thrust in a reverse direction on the first axis.

It is also preferable that the plural thrusters for collision avoidance mentioned above include at least one thruster for translation which outputs a component of translational thrust and at least four thrusters for posture control which independently carry out posture control around two axes being orthogonal to the translational thrust axis.

It is also preferable that the aforementioned single thruster for translation includes a thruster which is provided on the translational thrust axis and outputs translational thrust, whereas the aforementioned four thrusters for posture control include a pair of thrusters and another pair of thrusters. The first pair of thrusters are arranged on one of these two axes, which are orthogonal to each other with the translational thrust axis as the origin, in such a manner that these two thrusters face each other with the origin between and output thrust in an opposite direction, respectively. The second pair of thrusters are arranged on the other one of the two axes, which are orthogonal to each other, in such a manner that these two thrusters face each other with the origin between and output thrust in an opposite direction, respectively.

In such an arrangement, it is possible to maintain the generation of thrust in the direction of the thrust axis and carry out an avoidance operation by a minimum use of essential thrusters. Consequently, it is possible to realize a safe rendezvousing spacecraft of a simplified construction that makes flights close to space stations or any other facilities in orbit.

BRIEF DESCRIPTION OF THE DRAWINGS

FIGS. 3(a) and 3(b) are arrangement drawings of thrusters according to an embodiment 2 of the present invention.

FIGS. 4(a) and 4(b) are arrangement drawings of thrusters according to an embodiment 3 of the present invention.

FIG. 5 is a block diagram showing a conventional device.

DESCRIPTION OF THE PREFERRED EMBODIMENTS

Embodiment 1

Figure 1:
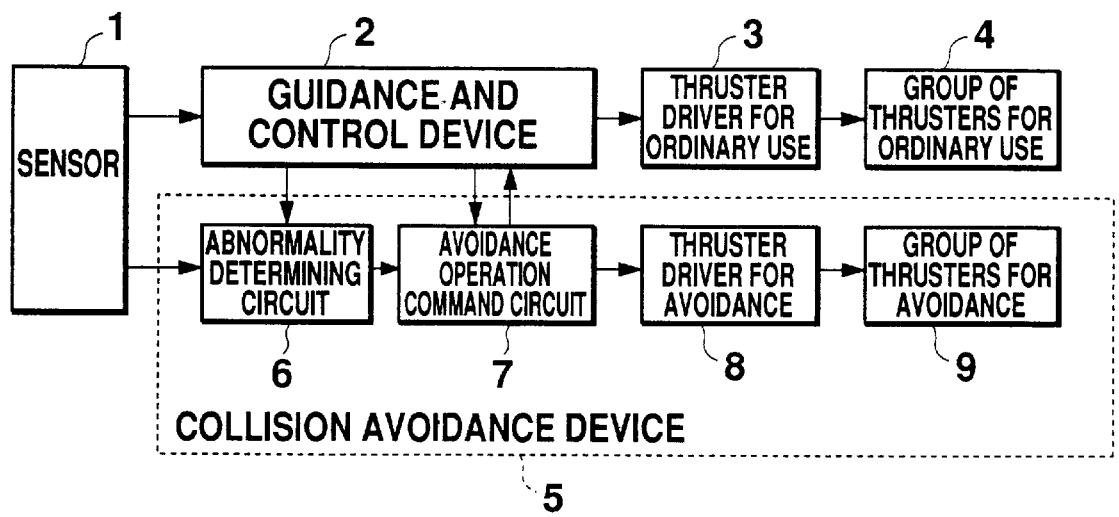
FIG. 1 is a block diagram showing an embodiment 1 of the present invention.

FIG. 1 shows a an arrangement according to an embodiment 1 of the present invention. In the FIG. 1, numerals 1 to 4 are the same as those in FIG. 5 which show an embodiment of a conventional device. Numeral 5 is a collision avoidance device of the present invention. Numeral 6 is an abnormality determining circuit. Numeral 7 is an avoidance operation command circuit. Numeral 8 is a thruster driver for avoidance. Numeral 9 is a group of thrusters for avoidance.

Figures 2A, 2B:
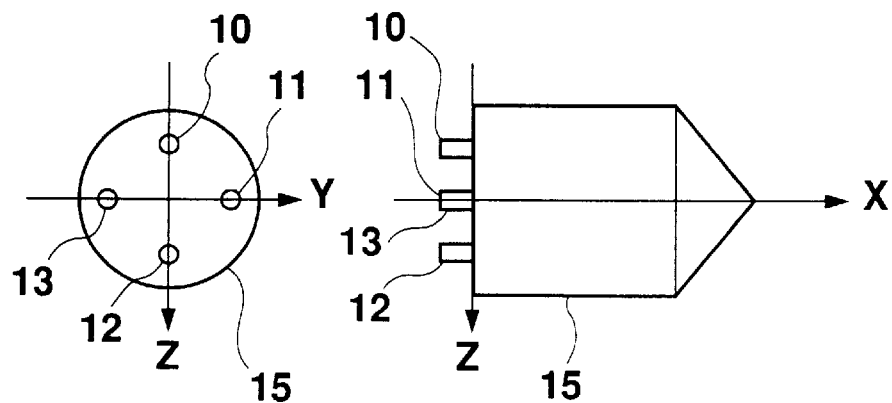
FIGS. 2(a) and 2(b) are arrangement drawings of thrusters according to an embodiment 1 of the present invention.
Figure 6:
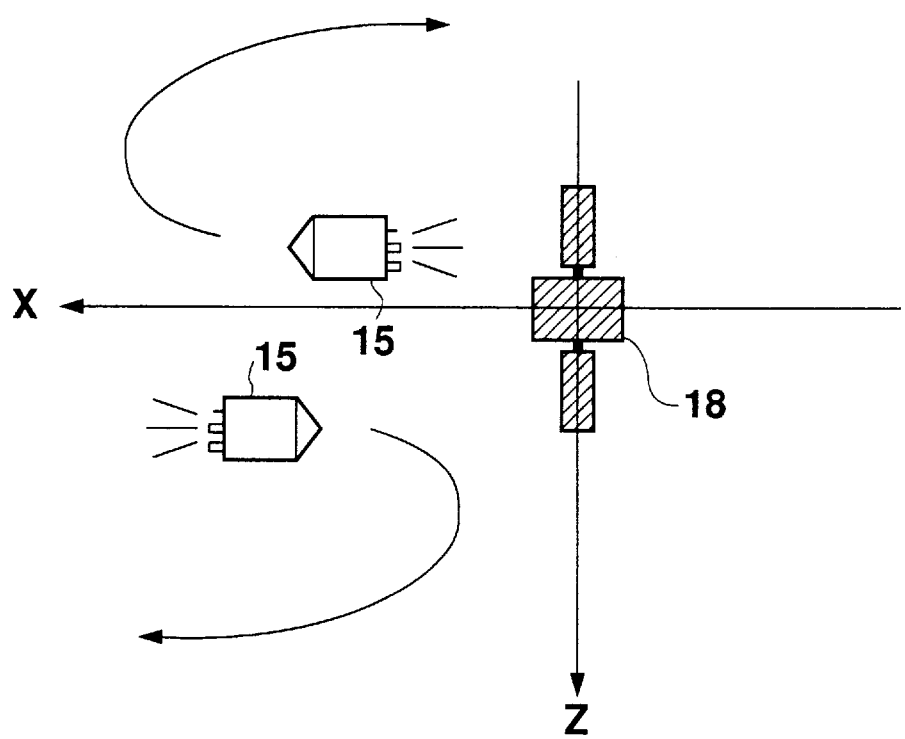
FIG. 6 shows a correlation between a direction of injection for collision avoidance and an avoidance orbit.
Figure 7:
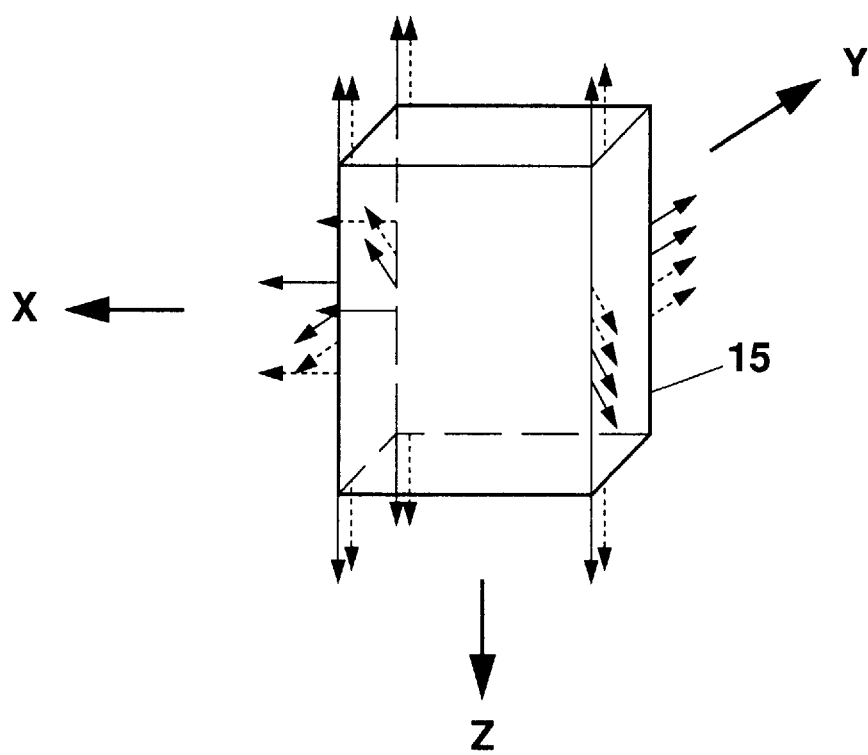
FIG. 7 shows an example of arrangement of thrusters according to an embodiment of the conventional device.

FIGS. 2(a) and 2(b) show an arrangement of a group of those thrusters for avoidance 9 according to the embodiment 1. An illustration of a group of thrusters for ordinary use 4 is omitted. In the drawings, numerals 10, 11, 13, and 15 represent a first thruster, a second thruster, a fourth thruster, and a rendezvousing spacecraft, respectively.

In the embodiment 1 of the present invention, each of the devices including the collision avoidance device 6 operates in the following manner. During a normal flight, in the same manner as the prior art, a guidance and control device 2 computes required control force of six degrees freedom in total concerning position control in three dimensional space and triaxial posture control in accordance with a measurement signal from a sensor 1, and generates a drive command for each thruster. In reply to the drive command received, a thruster driver for ordinary use 3 drives the group of thrusters for ordinary use 4. During such a normal flight, in the collision avoidance device 5, the abnormality determining circuit 6 selects a signal designated by the guidance and control device 2, from among the monitor signals outputted by the sensor 1 concerning flight conditions, (e.g., a relative position, a posture, and acceleration), and compares the signal or a value calculated from the signal with a reference value previously set in the abnormality determining circuit 6. In such a manner, a repetitive determination of the presence of abnormality, such as a mechanical failure, an excess of posture error, and a deviation from a predetermined orbit is carried out.

When any abnormality is found, the avoidance operation command circuit 7 is notified of the incident. The avoidance operation command circuit 7 then determines how to cope with the situation based on the type of the incident notified and a criterion showing the risk of collision, (e.g., an estimated amount of time the spacecraft reaches the target), which is provided by the guidance and control device 2. An outcome of the determination is transmitted to the guidance and control device 2 as a command to perform the collision avoidance.

If the avoidance operation command circuit 7 determines that one or more thrusters are broken, or may be broken, and if there is not a sufficient amount of time left before the spacecraft reaches the target, then the guidance and control device 2 will receive a command not to send any drive command to the thruster driver for ordinary use, thereby preventing the thrusters for ordinary use from being used. On the other hand, in accordance with a collision avoidance operation command generated by the avoidance operation command circuit 7 itself generated, the avoidance operation command circuit 7 generates an injection command corresponding to Equation 3 and provides it to the thruster driver for avoidance 8. Equation 3 stands for an expression of an instruction which brings about the output of translational thrust by using the first thruster 10 to the fourth thruster 14, the generation of torque around an axis Y by using the second thruster 10 or the third thruster 12, and the generation of torque around an axis Z by using the second thruster 11 or the fourth thruster 13 in the arrangement of thrusters of FIG. 2. Based on Equation 3, the avoidance operation command circuit 8 drives the group of thrusters for avoidance 9, whereby injection for collision avoidance is carried out with the thrust axis being maintained.

$$\begin{bmatrix} Fx \\ Ty \\ Tz \end{bmatrix} = \begin{bmatrix} F1 & F2 & F3 & F4 \\ -r1F1 & 0 & r3F3 & 0 \\ 0 & -r2F2 & 0 & r4F4 \end{bmatrix} \begin{bmatrix} a1 \\ a2 \\ a3 \\ a4 \end{bmatrix} \quad \text{[Equation 3]}$$

Fx: Translational thrust;

Ty: Rotation torque around the axis Y;

Tz: Rotation torque around the axis Z;

F1 to F4: Thrust of the first to the fourth thrusters;

r1 to r4: Distance between the center of gravity of a spacecraft and a line of action of the first to the fourth thrusters, respectively;

a1 to a4: Drive command for the first to the forth thrusters (1=drive; 0=do not drive).

However, a definition of the coordinate axes and an arrangement of thrusters shall be based on FIG. 2. The thrusters shall be arranged in such a manner that conditions "r1F1=r3F3 and r2F2=r4F4" are nearly satisfied.

Example of calculation 1: In order to generate torque around an axis +Y under the condition that translational thrust is on, "(Fx, Ty, Tz)=(F2+F3+F4, r3F3, 0)" is obtained by a drive command which is "(a1, a2, a3, a4)=(0, 1, 1, 1)."

Example of calculation 2: In order to generate torque around an axis +Y and an axis −Z under the condition that translational thrust is on, "(Fx, Ty, Tz)=(F2+F3, r3F3,−r2F2)" is obtained by a drive command which is "(a1, a2, a3, a4)=(0, 1, 1, 0)."

In the aforementioned embodiment 1 of the present invention, the injection for collision avoidance and the generation of posture control torque around these two coordinate axes, which are orthogonal to the translational thrust axis, are carried out by using four pieces of thrusters for avoidance. However, as a matter of course, it is possible to fulfill the same function by using more than four thrusters.

Embodiment 2

Construction of an embodiment 2 of the present invention is same as that of the embodiment 1.

FIGS. 3(a) and 3(b) show an arrangement of the group of thrusters for avoidance 9 according to the embodiment 2, respectively. In the drawings, numerals 10, 11, 13, and 15 represent the first thruster, the second thruster, the fourth thruster, and the rendezvousing spacecraft, respectively.

Operations in the embodiment 2 correspond to those of the embodiment 1 except that, when any abnormality arises in a thruster or thrusters, the avoidance operation command circuit 7 generates to the thruster driver for avoidance 8 a command to execute injection for collision avoidance which is corresponding to Equation 4. Equation 4 stands for an expression of instruction which brings about the output of translational thrust by using the first thruster 10 and the third thruster 12, the generation of torque around the axis Y by using the first thruster 10 or the third thruster 12, and the generation of torque around the axis Z by using the second thruster 11 or the fourth thruster 13 in the arrangement of thrusters shown in FIGS. 3(a) and 3(b). Based on Equation 4, the avoidance operation command circuit 8 drives the group of thrusters for avoidance 9, whereby injection for collision avoidance is carried out with the thrust axis being maintained.

$$\begin{bmatrix} Fx \\ Ty \\ Tz \end{bmatrix} = \begin{bmatrix} F1 & 0 & F3 & 0 \\ -r1F1 & 0 & r3F3 & 0 \\ 0 & r2F2 & 0 & -r4F4 \end{bmatrix} \begin{bmatrix} a1 \\ a2 \\ a3 \\ a4 \end{bmatrix} \quad \text{[Equation 4]}$$

Fx: Translational thrust;

Ty: Rotation torque around the axis Y;

Tz: Rotation torque around the axis Z;

F1 to F4: Thrust of the first to the fourth thrusters;

r1 to r4: Distance between the center of gravity of a spacecraft and a line of action of the first to the fourth thrusters, respectively;

a1 to a4: Drive command for the first to the forth thrusters (1=drive; 0=do not drive).

However, a definition of the coordinate axes and an arrangement of thrusters shall be based on FIG. 3. The thrusters shall be arranged in such a manner that condition "r1F1=r3F3" is nearly satisfied.

Example of calculation 1: In order to generate torque around an axis +Y under the condition that translational thrust is on, "(Fx, Ty, Tz)=(F3, r3F3, 0)" is obtained by a drive command which is "(a1, a2, a3, a4)=(0, 0, 1, 0)."

Example of calculation 2: In order to generate torque around an axis +Y and an axis −Z under the condition that translational thrust is on, "(Fx, Ty, Tz)=(F3, r3F3, −r4F4)" is obtained by a drive command which is "(a1, a2, a3, a4)=(0, 0, 1, 1)."

In the aforementioned embodiment 2 of the present invention, a group of thrusters for avoidance are used in such a manner that the injection for collision avoidance and the generation of posture control torque around a coordinate axis which is orthogonal to the translational thrust axis are carried out by using two pieces of thrusters, whereas the generation of posture control torque around the third axis which is orthogonal to the aforementioned two axes is carried out by using two pieces of independent thrusters. However, as a matter of course, it is possible to fulfill the same function by using more than four pieces of thrusters.

Embodiment 3

Arrangement of an embodiment 3 of the present invention is the same as that of the embodiment 1.

FIGS. 4(a) and 4(b) show an arrangement of the group of thrusters for avoidance 9 in the embodiment 3, respectively. In the drawings, numerals 10, 11, 12, 13, 14, and 15 represent the first thruster, the second thruster, the third thruster, the fourth thruster, the fifth thruster, and the rendezvousing spacecraft, respectively.

Operations in the embodiment 3 are same as those of the embodiment 1 except that when any abnormality arises in one or more thrusters, the avoidance operation command circuit 7 generates a command for the thruster driver for avoidance 8 to execute injection for collision avoidance that corresponds to equation 5. Equation 5 stands for an expression of instructions which bring about: the output of translational thrust by using the fifth thruster 14; the generation of torque around the axis Y by using the first thruster 10 or the third thruster 12; and the generation of torque around the axis Z by using the second thruster 11 or the fourth thruster 13 in the arrangement of thrusters shown in FIGS. 4(a) and 4(b). Based on Equation 5, the avoidance operation command circuit 8 drives the group of thrusters for avoidance 9, whereby injection for collision avoidance is carried out with the thrust axis being maintained.

$$\begin{bmatrix} Fx \\ Ty \\ Tz \end{bmatrix} = \begin{bmatrix} 0 & 0 & 0 & 0 & F5 \\ r1F1 & 0 & -r3F3 & 0 & 0 \\ 0 & r2F2 & 0 & -r4F4 & 0 \end{bmatrix} \begin{bmatrix} a1 \\ a2 \\ a3 \\ a4 \end{bmatrix} \quad \text{[Equation 5]}$$

Fx: Translational thrust;

Ty: Rotation torque around the axis Y;

Tz: Rotation torque around the axis Z;

F1 to F5: Thrust of the first to the fifth thrusters;

r1 to r4: Distance between the center of gravity of a spacecraft and a line of action of the first to the fourth thrusters, respectively;

a1 to a5: Drive command for the first to the fifth thrusters (1=drive; 0=do not drive).

However, a definition of the coordinate axes and an arrangement of thrusters is based on FIG. 4.

Example of calculation 1: In order to generate torque around an axis +Y under the condition that translational thrust is on, "(Fx, Ty, Tz)=(F5, r1f1, 0)" is obtained by a drive command which is "(a1, a2, a3, a4, a5)=(1, 0, 0, 0, 1)."

Example of calculation 2: In order to generate torque around an axis +Y and an axis −Z under the condition that translational thrust is on, "(Fx, Ty, Tz)=(F5, r1f1, −r4F4)" is obtained by a drive command which is "(a1, a2, a3, a4, a5)=(1, 0, 0, 1, 1)."

In the aforementioned embodiment 3 of the present invention, a group of thrusters for avoidance are used in such a manner that the injection for collision avoidance is carried out by using a single piece of thruster; whereas the generation of posture control torque around a coordinate axis which is orthogonal to the translational thrust axis is carried out by using four pieces of independent thrusters. However, as a matter of course, it is possible to fulfill the same function by using more than five thrusters.

In the embodiments 1 to 3, a group of thrusters for avoidance are used when abnormality arises in a group of thrusters for ordinary use. However, as a matter of course, in order to ensure the safety of a flight close to a target in a more scrupulous manner, it is also preferable in the present invention to use the following systems: a system in which if an abnormality arises in all of the plural groups of thrusters provided which are equivalent to the thrusters for ordinary use, then a group of thrusters for avoidance are used as substitutes; and a system in which a group of thrusters for ordinary use and plural groups of thrusters for avoidance are provided, and even if abnormality arises in a group of thrusters for avoidance, that are used as substitutes for a group of thrusters for ordinary use, another group of thrusters for avoidance is used as further substitutes.

While there has been described what are at present considered to be preferred embodiment of the invention, it will be understood that various modifications maybe made thereto, and it is intended that the appended claims cover all such modifications as fall within the true spirit and scope of the invention.

What is claimed is:

1. A collision avoidance device for rendezvous spacecraft having a plurality of thrusters dedicated for collision avoidance and provided separately from all other thrusters, said thrusters for collision avoidance generating translational thrust and posture control torque around two axes which are orthogonal to a translational thrust axis representing the translational thrust, wherein when collision avoidance is required, operation of said other thrusters is replaced by operation of said dedicated plurality of thrusters for collision avoidance and a collision avoidance operation is carried out maintaining generation of thrust in a direction of a translational thrust vector by driving said thrusters for collision avoidance.

2. The collision avoidance device for rendezvous spacecraft according to claim 1, wherein a collision avoidance operation is carried out by rendering at least one of said thrusters for collision avoidance inactive.

3. The collision avoidance device for rendezvous spacecraft according to claim 1, wherein said thrusters for collision avoidance comprise at least four thrusters, each of which contains a component of translational thrust in its output and generates posture control torque around two axes being orthogonal to a translational thrust axis, and wherein a thruster driver controls relative outputs of said thrusters for collision avoidance, whereby a collision avoidance operation is performed.

4. The collision avoidance device for rendezvous spacecraft according to claim 3, wherein said thrusters for collision avoidance include four thrusters, said four thrusters being arranged on two axes which are orthogonal to a translational thrust axis and also meet each other at right angles at a point of the translational thrust axis with said point as an origin; said four thrusters also being paired where each pair of thrusters is opposite each other with the origin as a center; and each of said four thrusters outputs thrust in a direction which is parallel to the translational thrust axis.

5. The collision avoidance device for rendezvous spacecraft according to claim 1, wherein said thrusters for collision avoidance include: two or more thrusters for translation which are capable of outputting a component of translational thrust and at the same time generating posture control torque around a first axis being orthogonal to a translational thrust axis; and two or more thrusters for posture control which independently carry out posture control around a second axis being orthogonal to both of said translational thrust axis and said first axis.

6. The collision avoidance device for rendezvous spacecraft according to claim 5, wherein said thrusters for translation are arranged opposite to each other with a point of intersection of the second axis and the translational thrust axis as a center, and output thrust in a direction which is parallel to the translational thrust axis, whereas said thrusters for posture control are arranged opposite to each other with a point of intersection of the first axis and the translational thrust axis as a center, and output thrust in an outward direction on the first axis.

7. The collision avoidance device for rendezvous spacecraft according to claim 1, wherein said thrusters for collision avoidance include at least one thruster for translation which outputs a component of translational thrust and at least four thrusters for posture control which independently carry out posture control around two axes being orthogonal to a translational thrust axis.

8. The collision avoidance device for rendezvous spacecraft according to claim 7, said thruster for translation includes a single thruster which is provided on a translational thrust axis and outputs thrust, wherein said thrusters for posture control include: a pair of thrusters which are arranged on one of two axes being orthogonal to each other with the translational thrust axis as an origin in such a manner that these two thrusters are opposite each other with the origin between, and output thrust in an opposite direction; and another pair of thrusters which are arranged on the other one of these two axes being orthogonal to each other in such a manner that these two thrusters are opposite each other with the origin between, and output thrust in an opposite direction.

* * * * *